Figure 1:
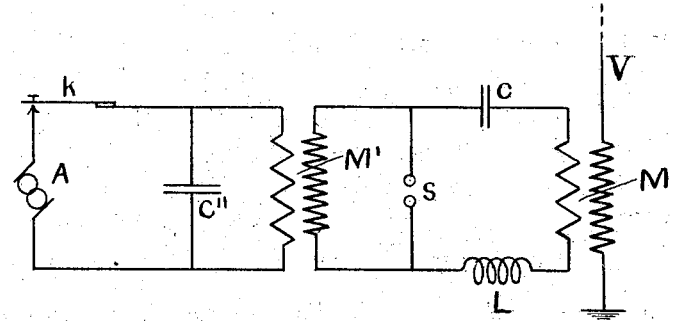

No. 767,982. PATENTED AUG. 16, 1904.
J. S. STONE.
SPACE TELEGRAPHY.
APPLICATION FILED NOV. 25, 1903.
NO MODEL.

WITNESSES: INVENTOR:

No. 767,982.  
Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 767,982, dated August 16, 1904.

Application filed November 25, 1903. Serial No. 182,629. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

This invention relates to wireless or space telegraphy in which signals are transmitted in the form of electroradiant energy without connecting wires between the transmitting and receiving stations; and it more particularly relates to selective and multiplex space telegraph systems in which the signals to be selectively or separately received are transmitted by means of electromagnetic waves, which may all be of the same frequency or time of vibration, but which are differentiated from one another by the number of groups or trains of waves transmitted per unit of time. Thus by means of the system herein described it is possible to selectively receive the energy of electromagnetic signal-waves not only of a predetermined frequency or time of vibration to the exclusion of waves of other frequencies, but also of a predetermined group or wave-train frequency to the exclusion of waves of other group or wave-train frequencies.

In wireless or space signaling in which signals are transmitted by electromagnetic waves in the form of radiant energy the frequency of said waves is usually of the order one million periods per second; but these waves are transmitted in groups or trains, each group or train resulting from the disruptive discharge of a condenser across a spark-gap. The number of these disruptive discharges per unit of time determines what I have herein termed the "group frequency" or the "wave-train frequency," which may be two hundred, three hundred, five hundred, &c., per second, as distinguished from the electrical frequency of the electromagnetic waves making up these groups, which frequency, as before stated, is usually of the order of one million periods per second and is equal to the ratio of the speed of light to the wave length of the transmitted wave.

Systems in which signals transmitted by electromagnetic waves of one group frequency are selectively received to the exclusion of signals transmitted by electromagnetic waves of other group frequencies are well-known in the art of space telegraphy to-day, having been described in United States Letters Patent No. 660,155, granted October 23, 1900, to B. A. Fiske on an application filed September 7, 1898. In this patent is described a self-restoring coherer serially connected with a magnet having its armature attuned to respond to a definite frequency in the manner well known in the system of reed or harmonic telegraphy developed by Gray and others, and in the British patent to A. E. Blondel, No. 21,909 of 1900, is described a self-restoring coherer serially connected with a monotelephone or a telephone whose diaphragm is attuned to respond to a definite frequency in the manner well known in the system of harmonic telegraphy developed by Mercadier. In the invention herein described either one of these mechanically-attuned receiving instruments may be employed as a signal-indicating device or as a relay, as hereinafter more fully described.

The systems above referred to have been repatented a number of times in this country, and in Letters Patent No. 715,203 is described such a system in which the elevated conductor is attuned, as to its fundamental or gravest period of vibration, to the frequency of the electromagnetic waves. In the British patent aforesaid the local circuit containing the monotelephone is electrically attuned by a coil and a condenser to the group or wave-train frequency of the waves, being the same frequency to which the monotelephone is mechanically attuned; but the system herein described does not depend solely upon such attuning of the elevated conductor nor solely upon such attuning of the local coherer-circuit.

In the system herein described a receiving system provided with means mechanically attuned to respond only to signals transmitted by electromagnetic waves of a predetermined group or wave-train frequency is combined with a closed resonant circuit attuned to respond to electromagnetic waves of one predetermined electrical frequency to the exclusion of waves of different electrical frequencies.

A system electrically attuned to respond to electromagnetic waves of one frequency to the exclusion of electromagnetic waves of different frequency I have described in my Letters Patent Nos. 714,756 and 714,831, to which reference may be had for a more complete disclosure of the principles involved than is necessary to herein set forth.

Figure 2:
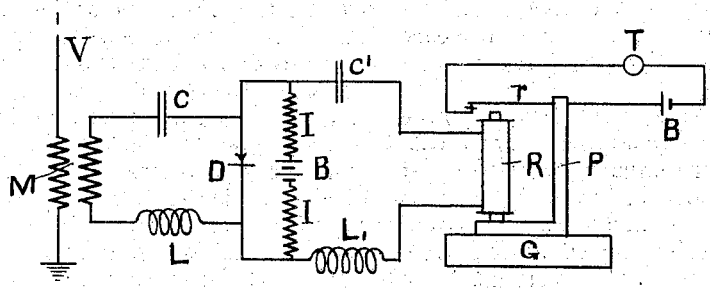
Figure 3:
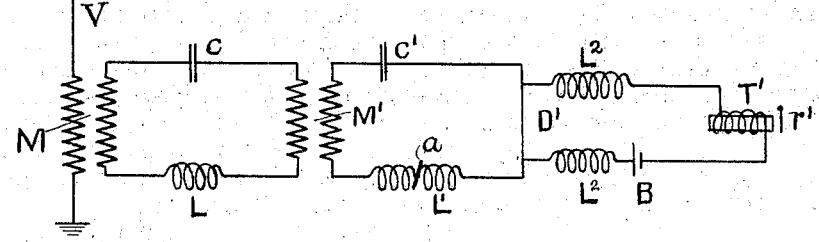

In the drawings which accompany and form a part of this specification, Figure 1 illustrates in diagram a transmitting system adapted to develop simple harmonic electromagnetic waves of a definite frequency or time of vibration and also of a constant group or wave-train frequency. Figs. 2 and 3 illustrate in diagram receiving systems embodying two forms of my invention.

In the figures, V V represent elevated conductors. M M' are transformers. C C' C'' are condensers. L L' L$^1$ are inductances. L$^2$ L$^2$ are choking-coils. D D' are self-restoring wave-detectors or electric translating devices. B B' are batteries. R is an electromagnet. $r$ is a reed mounted on the standard P. T T' are signal-indicating devices. I I are impedances.

The resonant circuits M L D C, M L M' C, and M' L' D' C' are each attuned to the frequency of the electromagnetic waves by which the signals to be received are transmitted, and as set forth in my Letters Patent above referred to currents of much greater amplitude or strength are developed in each circuit by waves of said frequency than by waves of any other frequency.

In Fig. 2 is shown any one of the well-known self-restoring wave-detectors or electric translating devices D connected in series with the resonant circuit M C L, and in Fig. 3 is shown a wave-detector or electric translating device D' which utilizes in its operation the dissipated energy of the currents developed in the resonant circuit of which it forms a part—such, for example, as the fine wire or strip of a bolometer described in my applications, Serial Nos. 119,211 and 182,628. In series with the translating device D is an electromagnet R, which is provided with an armature or reed $r$, formed of a thin strip of steel supported at one end or otherwise, so as to have a definite and predetermined period of vibration. If desired, this reed may be formed of non-magnetic metal and provided at its extremity with an armature of soft iron. This armature $r$ when its amplitude of vibration is sufficient for the purpose closes the circuit of battery B of the signal-indicating device T, which may be a telephone, and for this purpose the armature $r$ and its coöperating contact-point may be provided with carbon contacts.

In Fig. 3 the indicating device is a monotelephone or a telephone T', having a diaphragm $r'$ adapted to respond more strongly to current vibrations of one frequency than to current vibrations of other frequencies. Such telephones are well known and require no description here.

The resonant circuits associated with the elevated conductor V absorb sufficient energy to operate the wave-detectors D D' only when the electromagnetic waves received by the elevated conductor are of the frequency to which the resonant circuits are attuned. When waves of the frequency to which the resonant circuits are attuned are received by the elevated conductor, electrical oscillations of corresponding frequency are developed in the resonant circuits, and as the wave-detectors D D' are self-restoring pulsations of battery-current are set up in the local circuits D C' R L$_1$ or D' B T'. The frequency of these pulsations of battery-current correspond to the number of groups or trains of waves, or to what I have hereinbefore referred to as the "group frequency" or "wave-train frequency." Consequently if the reed or armature $r$ or $r'$ is mechanically attuned to vibrate in this frequency it will execute vibrations of greater amplitude than it would execute were the pulsations of battery-current of a different frequency. In other words, if the waves are transmitted with a group frequency different from that to which the receiver is attuned the reed will either not respond or else its amplitude of vibration will be insufficient to close the circuit of the indicating device T or to produce an appreciable note where the signal-indicating device T is not employed, even if the frequency of the electromagnetic waves be that to which the resonant circuit is attuned. An acoustic resonator G, attuned to the period of the reed $r$, may be employed.

In place of the magnet R and reed $r$ I may connect in the local circuit a fine wire of magnetic material under such tension so as to have a natural period of vibration corresponding to the period of the pulsations of battery-current. The reaction of the magnetic field set up around this wire on the field of a powerful permanent magnet surrounding the wires will cause the latter to execute vibrations of appreciable amplitude when the pulsations of battery-current flowing therethrough correspond in frequency to the frequency to which this wire is mechanically attuned. This wire may actuate a microphonic relay in the manner described by Cauro in *L'Eclairage Electrique*, Vol. 19, May 27, 1899, page 301. As a substitute for the magnet R and reed $r$ I may also use the microtelephonic relay described in British Patent No. 9,712, series of 1898, granted to Oliver Lodge, or the modification thereof described by Shaw in the *Proceedings of the Physical*

*Society of London*, Vol. XVII, page 317, London, 1901.

In Fig. 3, *a* is a flat movable armature such as described in my Letters Patent No. 737,170, August 25, 1903, having its plane at an angle of forty-five degrees with the axis of the coil L'. The suspension of this armature is tensioned, so as to have a torsional period equal to the period of the group or wave-train frequency. The operation of this armature is more fully described in said patent.

By thus combining the old and well-known systems of tuning mechanically to group frequency with the selective receiving systems of my hereinbefore-mentioned Letters Patent a greater security from interference from outside sources may be effected, because the indication of a signal by the system herein described depends upon the coöperation of an accurately-attuned mechanical system with an accurately-attuned electrical system. Furthermore, by providing each one of a number of adjacent receiving systems with a differently-attuned reed a corresponding number of separate signals may be simultaneously transmitted by means of electromagnetic waves of a single frequency radiated from the same or from different stations, each provided with means for causing the emission of these waves in the group frequency corresponding to the frequency of the reed at the station designed to receive the signal, and the signals may be thus selectively or separately received, each at its proper receiving-station.

As explained in my Letters Patent above referred to, a number of resonant circuits, each attuned to a different frequency, may be associated with a single elevated conductor, and each wave-detector may have associated with it a plurality of electromagnetic devices, each mechanically attuned to a different group frequency.

The alternating-current generator A of Fig. 1 is provided with the usual devices for maintaining constant speed, and therefore the frequency of the currents produced by said generator is constant. The group or wave-train frequency—*i. e.*, the number of times per second that the condenser C is charged and discharged across the spark-gap—is equal numerically to twice the frequency of the currents developed by the generator.

A condenser C'' of the proper capacity, connected in series with the primary of transformer M', is of material assistance in maintaining the load of the generator, and hence the frequency of the currents developed by the generator more constant.

I claim—

1. In a system for receiving the energy of electromagnetic signal-waves of one frequency to the exclusion of the energy of like waves of different frequency, an elevated conductor, an electric translating device, and a resonant circuit or group of resonant circuits, interposed between said elevated conductor and said electric translating device, said resonant circuits being attuned to the frequency of the waves the energy of which is to be received, in combination with a local circuit including in series said electric translating device and an electromagnetic device provided with means mechanically attuned to respond to the group or wave-train frequency of said electromagnetic signal-waves and a source of electrical energy associated with said local circuit, substantially as described.

2. In a system of space telegraphy, an elevated conductor, a self-restoring wave-detector or receiver, and a resonant circuit operatively connected with said elevated conductor and said self-restoring wave-detector or receiver, said resonant circuit being attuned to the frequency of the waves the energy of which is to be received, in combination with a circuit including in series said self-restoring wave-detector or receiver and an electromagnetic device provided with means mechanically attuned to respond to the group or wave-train frequency of said waves, and means in said circuit for attuning the circuit to the said group or wave-train frequency.

3. In a system of space telegraphy, an elevated conductor, a circuit attuned by capacity and inductance to be more responsive to electromagnetic waves of one frequency than to electromagnetic waves of other frequencies, associated with said elevated conductor, a self-restoring wave-detector, operatively connected with said circuit, and a signal-indicating device, mechanically attuned to respond to the group or wave-train frequency of said electromagnetic waves, operatively connected with said wave-detector.

4. In a system of space telegraphy, an elevated conductor, a circuit attuned by capacity and inductance to be more responsive to electromagnetic waves of one frequency than to electromagnetic waves of other frequencies, associated with said elevated conductor, a self-restoring wave-detector operatively connected with said circuit and a signal-indicating device, mechanically attuned to respond to the group or wave-train frequency of said electromagnetic waves, operatively connected with said wave-detector, in combination with a system adapted to transmit electromagnetic waves of the frequency to which said circuit is attuned and of the group or wave-train frequency to which said signal-indicating device is mechanically attuned.

5. In a system of space telegraphy, a receiver or wave-detector, a signal-indicating device, means connected in shunt to the terminals of the receiver or wave-detector and to the terminals of the signal-indicating device for impressing a unidirectional difference of potential thereon, and means whereby the aforesaid difference of potential may be varied by electromagnetic signal-waves.

6. In a system of space telegraphy, a circuit containing a receiver or wave-detector and a signal-indicating device connected in series, and a second circuit, containing a source of electric energy and an impedance, connected in shunt to the first-mentioned circuit.

7. In a system of space telegraphy, a circuit attuned by a coil and a condenser to a given group or wave-train frequency and containing a receiver or wave-detector and a signal-indicating device connected in series, and a second circuit, containing a source of electric energy and an impedance, connected in shunt to the first-mentioned circuit.

8. In a system of space telegraphy, a circuit, attuned by a coil and a condenser to a given group or wave-train frequency and containing a receiver or wave-detector and a signal-indicating device connected in series, said signal-indicating device being attuned mechanically to said given group or wave-train frequency.

9. In a system of space telegraphy, a circuit, including a receiver or wave-detector and attuned to a predetermined group or wave-train frequency by means of a coil and a condenser connected in series.

10. In a system of space telegraphy, a circuit, resonant to the frequency of the electromagnetic waves the energy of which is to be received, in combination with a circuit resonant to the group or wave-train frequency of said waves.

11. In a system of space telegraphy, a circuit, resonant to the frequency of the electromagnetic waves, the energy of which is to be received, in combination with a circuit resonant to the group or wave-train frequency of said waves, and a signal-indicating device mechanically attuned to said group or wave-train frequency operatively connected with the last-mentioned circuit.

12. In a system of space telegraphy, an elevated conductor, a closed circuit associated therewith and attuned to the frequency of the waves the energy of which is to be received, a self-restoring wave-detector operatively connected with said circuit, a second circuit connected with said wave-detector and attuned to the group or wave-train frequency of said waves and a signal-indicating device, mechanically attuned to said group or wave-train frequency, connected with the last-mentioned circuit.

13. In a system of space telegraphy, means for receiving the energy of electromagnetic signal-waves of one frequency to the exclusion of the energy of like waves of different frequency, in combination with a circuit attuned to a given group or wave-train frequency and containing a receiver or wave-detector and a signal-indicating device connected in series, said signal-indicating device being attuned mechanically to said group or wave-train frequency.

14. In a system of space telegraphy, means for receiving the energy of electromagnetic signal-waves of one frequency to the exclusion of the energy of like waves of different frequency, in combination with a circuit including a receiver or wave-detector and attuned to a predetermined group or wave-train frequency by means of a condenser and a coil.

15. In a system of space telegraphy, a circuit resonant to the frequency of the waves the energy of which is to be received in combination with an electromagnetic device mechanically attuned to the group or wave-train frequency of said waves.

16. In a system of space telegraphy, means for receiving the energy of electromagnetic signal-waves of one frequency to the exclusion of the energy of like waves of different frequency, in combination with an electromagnetic device mechanically attuned to the group or wave-train frequency of said waves.

17. In a system of space telegraphy, an elevated receiving-conductor, a resonant circuit associated therewith and attuned to the frequency of the waves the energy of which is to be received, an electroreceptive device adapted to utilize in its operation the dissipative energy of the electrical oscillations developed in said resonant circuit, and a signal-indicating device mechanically attuned to the group or wave-train frequency of said waves operatively connected with said electroreceptive device.

18. In a system of space telegraphy, an elevated receiving-conductor, a resonant circuit, attuned to the frequency of the waves the energy of which is to be received, an electroreceptive device adapted to utilize in its operation the dissipative energy of the electrical oscillations developed in said resonant circuit, a signal-indicating device, mechanically attuned to the group or wave-train frequency of said waves, operatively connected with said electroreceptive device, and a resonant circuit or a group of resonant circuits attuned to the same frequency as the first-mentioned resonant circuit and interposed between the elevated conductor and said first-mentioned resonant circuit.

19. In a system of space telegraphy, an elevated transmitting-conductor, a sonorous circuit associated therewith, an alternating-current generator, a transformer associating said alternating-current generator with said sonorous circuit, and a condenser connected across the terminals of the primary winding of said transformer.

20. In a space-telegraph receiving system, an electromagnet having an armature attuned mechanically to the group or wave-train frequency of the waves to be received, a local circuit containing a telephone or other signal-indicating device and adapted to be closed by said armature, and a contact provided with carbon through which said circuit may be closed by said armature, 21. In a space-telegraph receiving system, an electromagnet having an armature attuned mechanically to the group or wave-train frequency of the waves to be received, a circuit containing a telephone or other signal-indicating device and adapted to be closed by said armature, and a microphonic contact through which said circuit may be closed by said armature.

22. In a space-telegraph receiving system, means for indicating signals comprising an electromagnet having an armature attuned mechanically to the group or wave-train frequency of the electromagnetic signal-waves to be received and operatively connected with an acoustic resonator attuned to said frequency.

23. In a space-telegraph receiving system, a signal-indicating device, mechanically attuned to the group or wave-train frequency of the electromagnetic signal-waves to be received, in combination with an acoustic resonator.

24. In a system of space telegraphy, a resonant circuit attuned to the frequency of the waves the energy of which is to be received, an elevated conductor associated with said resonant circuit, a self-restoring electroreceptive device associated with said resonant circuit, a local circuit associated with said electroreceptive device and attuned to the group or wave-train frequency of said waves by a condenser and an inductance-coil, and a signal-indicating device associated with said local circuit and attuned mechanically to said group or wave-train frequency.

In testimony whereof I have hereunto subscribed my name this 24th day of November, 1903.

JOHN STONE STONE.

Witnesses:
G. A. HIGGINS,
BRAINERD T. JUDKINS.